United States Patent
Cohen et al.

(10) Patent No.: US 10,228,705 B2
(45) Date of Patent: Mar. 12, 2019

(54) UNMANNED VEHICLE FOR SERVICING EQUIPMENT

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US); Jonathan Lenchner, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/810,999

(22) Filed: Nov. 13, 2017

(65) Prior Publication Data
US 2018/0203469 A1 Jul. 19, 2018

Related U.S. Application Data (63) Continuation of application No. 15/406,963, filed on Jan. 16, 2017.

(51) Int. Cl.
| | |
|---|---|
| B64C 39/02 | (2006.01) |
| G05D 1/10 | (2006.01) |
| B64D 1/22 | (2006.01) |
| G08B 21/02 | (2006.01) |
| B25J 11/00 | (2006.01) |

(52) U.S. Cl.
CPC ............ *G05D 1/104* (2013.01); *B25J 11/005* (2013.01); *B64C 39/024* (2013.01); *B64D 1/22* (2013.01); *G08B 21/02* (2013.01); *B64C 2201/12* (2013.01); *B64C 2201/141* (2013.01); *G05B 2219/45045* (2013.01); *G05B 2219/45066* (2013.01); *Y10S 901/01* (2013.01)

(58) Field of Classification Search
CPC ............ B64C 39/024; B64C 2201/127; G05B 2219/45045; G05B 2219/45066
See application file for complete search history.

(56) References Cited

U.S. PATENT DOCUMENTS

| | | | |
|---|---|---|---|
| 2015/0148949 A1* | 5/2015 | Chin | G05D 1/0246 700/245 |
| 2016/0122956 A1* | 5/2016 | Christiansen | B60P 3/0255 180/2.2 |

OTHER PUBLICATIONS

List of IBM Patents or Patent Applications Treated as Related (Appenix P); Filed Nov. 13, 2017, 2 pages.

(Continued)

*Primary Examiner* — Anshul Sood
(74) *Attorney, Agent, or Firm* — Cantor Colburn LLP; Vazken Alexanian (57) ABSTRACT

A computer-implemented method of performing an automated maintenance operation on a piece of equipment includes determining, using a processor system, a diagnostic status of the piece of equipment using a first unmanned vehicle, and determining, using the processor system, a maintenance condition of the piece of equipment. A maintenance operation and a safety operation to be performed are identified based on the diagnostic status of the piece of equipment. A second unmanned vehicle is dispatched, using the processor system, to perform the maintenance operation and a third unmanned vehicle is dispatched, using the processor system, to perform the safety operation.

9 Claims, 4 Drawing Sheets

(56) References Cited

OTHER PUBLICATIONS

Guy M. Cohen, et al. "Unmanned Vehicle for Servicing Equipment," U.S. Appl. No. 15/406,963, filed Jan. 16, 2017.

* cited by examiner

FIG. 4

UNMANNED VEHICLE FOR SERVICING EQUIPMENT

DOMESTIC AND/OR FOREIGN PRIORITY

This application is a continuation of U.S. application Ser. No. 15/406,963, titled "UNMANNED VEHICLE FOR SERVICING EQUIPMENT" filed Jan. 16, 2017, the entire contents of which are incorporated herein by reference.

BACKGROUND

The present invention generally relates to maintaining equipment within an area, and more particularly, to the use of an integrated system of unmanned aerial vehicles for maintaining infrastructure.

Maintenance of infrastructure that includes fixtures or other equipment can be difficult depending on the location of the equipment. For example, accessing fixtures that are elevated typically requires a ladder and/or additional personal safety equipment and thus involves an increased level of difficulty and danger. A service person's limited maneuverability when on a ladder increases the risk of falling or serious injury during a maintenance operation. However, fixtures and other equipment in areas that are difficult to access are prevalent not only in residential houses, but also in public buildings and public spaces.

In other instances, the equipment can need to be powered down before a human can safely perform maintenance thereon. For example, an antenna that emits microwave radiation must cease all transmission to protect a maintenance person from harmful radiation when a lamp on the antenna tower is replaced. Such requirements can increase the downtime and/or further limit the functionality of the equipment.

There is also the issue of scale. As more Internet of Things (IoT) devices such as cameras, chemical sensors (e.g., air quality sensors), etc. are deployed, there is a need to automate the maintenance of such IoT devices. These IoT devices can require cleaning, sensor calibration and replacement of batteries on a regular basis in addition to repairs when the devices are malfunctioning. It is predicted that the number of these IoT devices in modern cities will soon reach millions.

There is therefore a need to reduce the risk associated with performing standard maintenance operations on fixtures and other equipment that are located in areas that are difficult to reach, as well as a need to reduce and in some instances eliminate the dependence on human labor for the maintenance of such devices.

SUMMARY

In one aspect, the present invention provides a computer-implemented method of performing an automated maintenance operation on a piece of equipment including determining, using a processor system, a diagnostic status of the piece of equipment using a first unmanned vehicle. A maintenance condition of the piece of equipment is determined using the processor system and a maintenance operation and a safety operation to be performed based at least in part on the diagnostic status of the piece of equipment are identified. A second unmanned vehicle is dispatched, using the processor system, to perform the maintenance operation and a third unmanned vehicle is dispatched, using the processor system, to perform the safety operation.

In one aspect, the present invention provides a system for maintaining equipment within a predetermined area, including a first unmanned vehicle configured to perform a diagnostic evaluation of the equipment, a second unmanned vehicle configured to perform a maintenance operation, and a third unmanned vehicle configured to perform a safety operation. A central control unit is operably coupled to the first unmanned vehicle, the second unmanned vehicle, and the third unmanned vehicle. The central control unit is configured to determine a diagnostic status of the equipment in response to data collected by the first unmanned vehicle and dispatch at least one of the second unmanned vehicle to perform a maintenance operation and the third unmanned vehicle to perform a safety operation in response to the diagnostic status of the equipment.

In one aspect, the present invention provides a computer program product comprising a computer readable storage medium having program instructions for controlling a processor to control a system of vehicles to perform operations associated with a piece of equipment, the program instructions executable by the processor to cause the processor to perform a method. The method includes determining a diagnostic status of the piece of equipment, identifying a maintenance operation and a safety operation to be performed based at least in part on the diagnostic status of the equipment, dispatching at least one unmanned vehicle to a location of the piece of equipment to perform the maintenance operation, and dispatching at least one unmanned vehicle to the location of the piece of equipment to perform the safety operation.

BRIEF DESCRIPTION OF THE DRAWINGS

In order that the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

Figure 1:
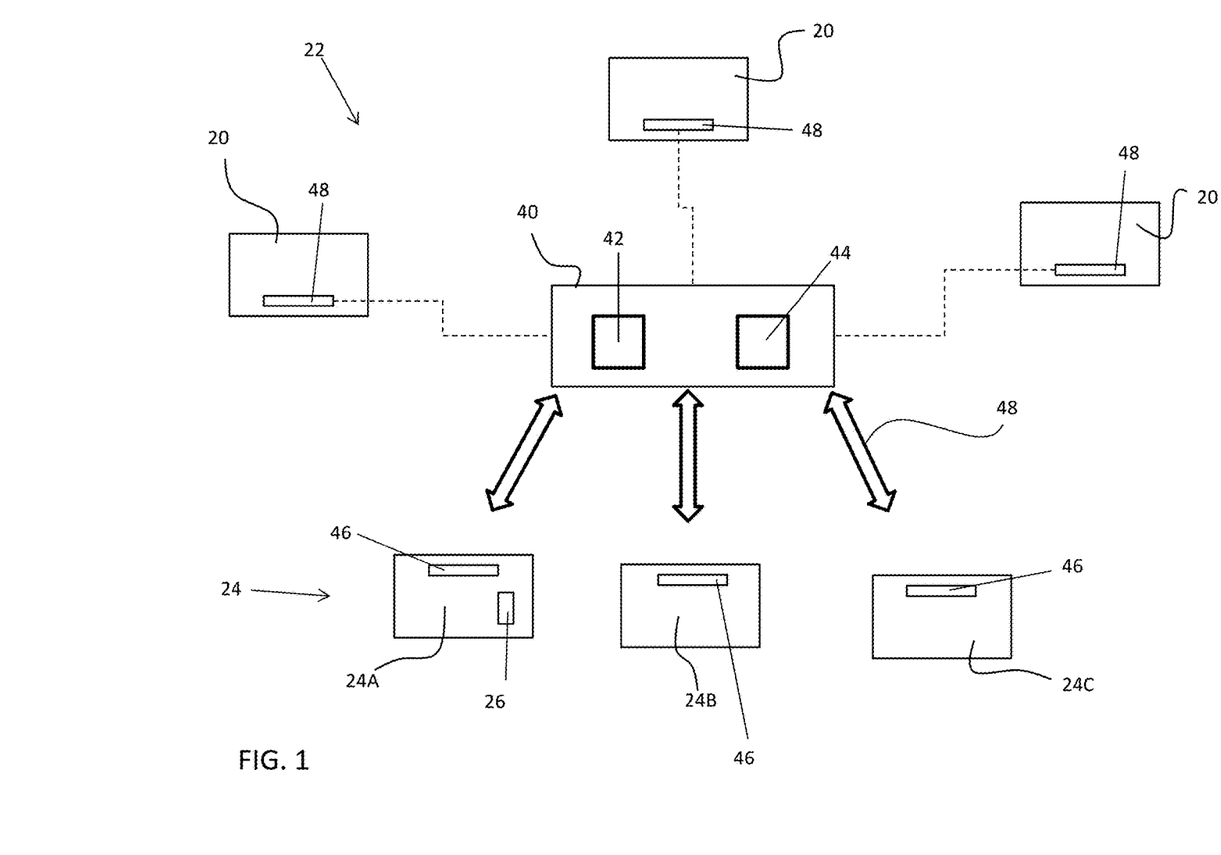
FIG. 1 depicts a schematic diagram of a system for performing one or more maintenance operations according to one or more embodiments of the present invention.

Referring now to FIG. 1, one or more pieces of equipment or fixtures 20 are located within a predetermined area. The predetermined area can be defined as a building, an enclosure, a public area, or a geographically defined area such as a town or city for example. Examples of the types of equipment 20 include, but are not limited to, lights, air vents, and ceiling based sensors, such as fire, smoke, carbon monoxide detectors, or air pollution detectors for example. It should be understood that any type of equipment, and in particular equipment that is located in an area that is not readily accessible, for example requiring the use of a ladder or other personal safety equipment, is contemplated herein. In embodiments including multiple pieces of equipment 20, the pieces of equipment 20 can be similar and configured to perform the same function, or alternatively, can be different and configured to perform distinct functions.

FIG. 1 further shows a system 22 for maintaining the fixtures or equipment 20 within the predetermined area and includes a plurality of unmanned vehicles (UVs) 24, such as robots or drones for example. The UVs 24 are controllable to perform one or more designated operations to maintain the equipment 20. The operations performable by the UVs 24 include any operation commonly performed during the life of a piece of equipment, including but not limited to cleaning, testing, repairing, and replacing all or a portion of the equipment for example. In some embodiments of the invention, all or a portion of the UVs 24 are aerial vehicles. Any type of UV 24 suitable for automatic and/or remote controlled vertical and horizontal flight is within the scope of the invention. Accordingly, a UV 24 having any number of lift generator rotors is contemplated herein.

In one or more embodiments, each of the plurality of UVs 24 within the system 22 is configured to perform a specific function. As shown, the plurality of UVs 24 includes at least one diagnostic UV 24A for determining a diagnostic status of one or more pieces of equipment, at least one maintenance UV 24B for performing one or more maintenance operations, and at least one safety UV 24C for performing a safety operation associated with the maintenance operation. Although a separate diagnostic UV 24A, maintenance UV 24B, and safety 24C are described for performing diagnostic evaluation, for performing maintenance operations, and for performing safety operations, respectively, it should be understood that embodiments where any of the UVs 24 of the system 22 are configured to perform more than one of these functions are also within the scope of the described embodiments of the invention.

The diagnostic UV 24A is configured to perform a diagnostic evaluation of one or more pieces of equipment 20 to determine a status of each of the pieces of equipment and whether or not a maintenance operation is required. In one or more embodiments of the invention, the diagnostic UV 24A is configured to evaluate only a single type of equipment 20. Alternatively, the diagnostic UV 24A, can be configured to evaluate the status of multiple types of equipment 20, such that in some embodiments, a single diagnostic UV 24A can be configured to identify the maintenance requirements for every piece of equipment 20 within the predetermined area.

To evaluate the functionality of a piece of equipment 22, the diagnostic UV 24A includes at least one sensor 26 for monitoring one or more parameters of the equipment 20. The sensor 26 can include, but is not limited to an optical sensor, a chemical sensor, an infrared camera, a visible light camera, and a testing kit. For example, if the piece of equipment 20 is a light, the sensor 26 can be an optical sensor for determining the condition (i.e. on, off, flickering) of the light. In embodiments where the piece of equipment 20 is a detector, such as a smoke, fire, or carbon monoxide detector for example, the diagnostic UV 24A can be configured to communicate (e.g., wirelessly) with the detector to activate a test procedure and determine if the detector is malfunctioning. In other instances the diagnostic UV 24A can release a chemical substance suitable for testing the detector operation and sensitivity setting. If the piece of equipment 20 includes an air vent or an air conditioning outlet, the diagnostic UV 24A can include a sensor 26 configured to measure the flow through the vent to determine if the vent is functioning properly.

Figure 2:
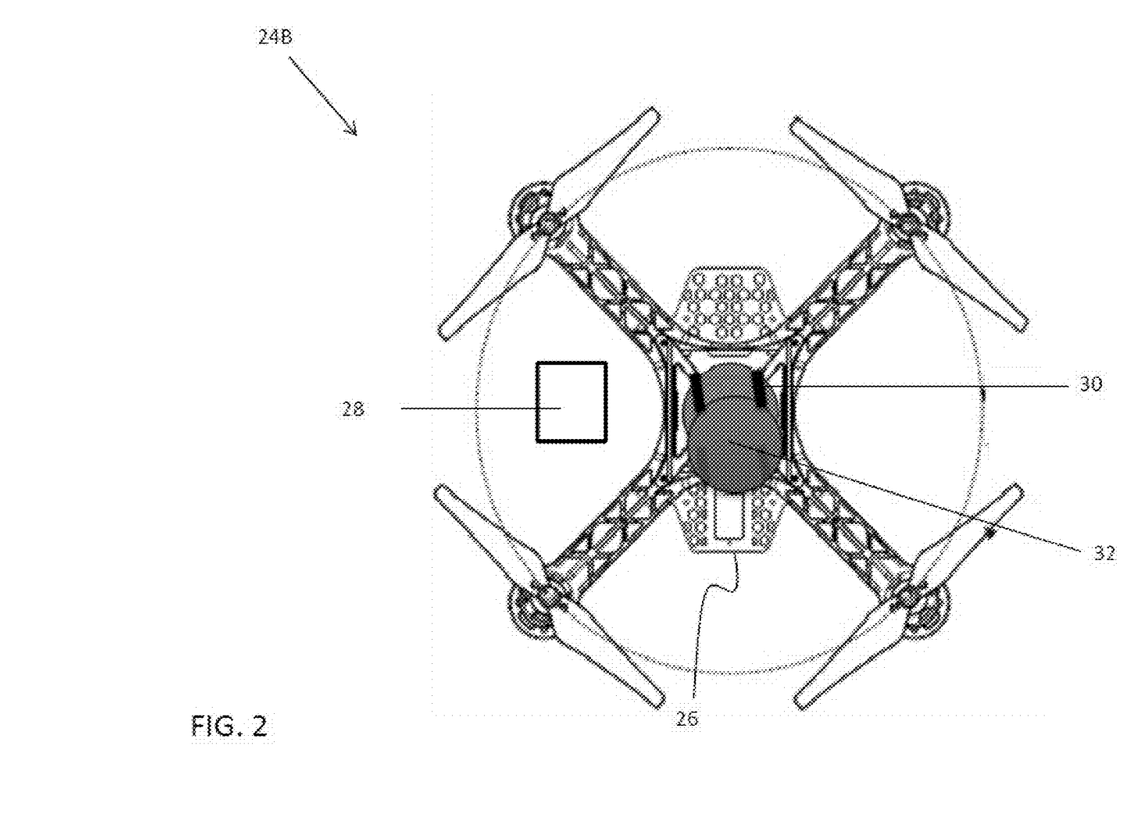
FIG. 2 depicts an example of an unmanned aerial vehicle according to one or more embodiments of the present invention.

An example implementation of a maintenance UV 24B dedicated to performing one or more maintenance operations associated with one or more pieces of equipment 20 is shown in more detail in FIG. 2. The maintenance UV 24B can include a compartment 28 formed in a body thereof, within which spare parts associated with the at least one piece of equipment 20 (shown in FIG. 1) can be stored. In one or more embodiments, the maintenance UV 24B includes at least one manipulator 30, such as a robotic arm for example, capable of manipulating one or more objects associated with the maintenance operation. In some embodiments, a tool attachment 32 can extend from a portion of the manipulator 30. The manipulator 30 and/or the tool attachment 32 can be operably coupled to a motor (not shown) for selectively manipulating the tool attachment 32 during a maintenance operation. The configuration of the manipulator 30, or of the tool attachment 32, can be selected based not only on the one or more maintenance operations to be performed, but also on the piece of equipment 20 requiring maintenance. For example, in embodiments where the maintenance UV 24B is intended to replace a light bulb within a light fixture, the manipulator 30, or the tool attachment 32 associated therewith, can vary based on the type of light bulb and the orientation of the light bulb when it is mounted within the light fixture. In the illustrated, non-limiting embodiment, the tool attachment 32 is a suction cup for supporting a light bulb. However, other types of suitable tool attachments 32, such as a screw driver, drill, saw, and hammer for example, are contemplate herein.

In one or more embodiments of the invention, the attachment 32 can be removably coupled to the manipulator 30 such that a plurality of interchangeable attachments 32 can be used therewith. As a result, the maintenance UV 24B can be adapted to perform a plurality of maintenance operations for one or more types of equipment 20 within the predetermined area. However, embodiments where an attachment 32 is permanently affixed to or integrally formed with the UV 24B are also contemplated herein.

Referring back to FIG. 1, the safety UV 24C is capable of performing one or more safety operations. In one or more embodiments of the invention, safety UV 24C performs the safety operation prior to or at the same time that the maintenance UV 24B performs the maintenance operation. The safety operation performed can depend on the type of maintenance operation being performed. In one or more embodiments, the safety operation includes erecting safety equipment in the proximity of the piece of equipment 20 being repaired. For example, in embodiments where the maintenance operation being performed by the maintenance UV 24B is a repair or replacement of an elevated piece of equipment 20, a plurality of safety UVs 24C can hold a net at a position underneath the piece of equipment 20 to capture falling objects or debris. Alternatively, or in addition, the safety UV 24C can function as an audio and/or visual indicator to warn persons near the piece of equipment 20 of potential hazards associated with the maintenance operation being performed.

Referring still to FIG. 1, a central control unit 40 is configured track the status of the equipment 20 within the predetermined area and coordinate operation of the plurality of UVs 24 based on that status such that maintenance of the equipment 20 is fully, or at least partially, automated. The central control unit 40 can include a memory 42 for storing maintenance records or information associated with each piece of equipment 20. In one or more embodiments, the stored maintenance records are used to predict future maintenance operations. Alternatively, or in addition, the memory 42 can store executable instructions used to control operation of the diagnostic, maintenance, and safety UVs 24A, 24B, 24C. The central control unit 40 can additionally include a processor 44 configured to execute the executable instructions stored within the memory 42.

In one or more embodiments of the invention, the plurality of UVs 24A, 24B or 24C include a local control unit 46 operably coupled to the central control unit 40 through a wireless communication system 48. The local control unit 46 is configured to control operation of the UV 24A, 24B or 24C in response to instructions received from the central control unit 40. Further, each of the local control units 46 can be configured to communicate with the central control unit 40 such that operation of the UVs 24A, 24B, 24C can be updated in real time. Although coordination of the plurality of UVs 24A, 24B, 24C is described with respect to the central control unit 40, embodiments where the local control units 46 are able to communicate with one another to provide enhanced coordination are also contemplated herein.

The central control unit 40 is able to dispatch a diagnostic UV 24A to maintain records on the status of each piece of equipment 20 within the predetermined area. The central control unit 40 can be configured to dispatch a diagnostic UV 24A based on a set schedule. For example, a diagnostic UV 24A can routinely follow a predetermined flight path to inspect the operational functionality of one or more pieces of equipment 20. Alternatively, the central control unit 40 can dispatch a diagnostic UV 24A on demand, such as in response to an indication that a piece of equipment 20 is malfunctioning.

The central control unit 40 is configured to identify which, if any, maintenance operations need to be performed on a piece of equipment 20 in response to information provided by the diagnostic UV 24A and/or maintenance schedule of the piece of equipment 20. The central control unit 40 will select and then dispatch a maintenance UV 24B to perform the maintenance operation. The selected maintenance UV 24B will have the appropriate manipulator 30 (shown in FIG. 2) or tool attachment 32 (shown in FIG. 2) for performing the one or more identified maintenance operations. The maintenance command provided to the maintenance UV 24B from the central control unit 40 can include a location of one or more pieces of equipment 20 and instructions regarding one or more maintenance operations to be performed on each piece of equipment 20.

The central control unit 40 is additionally configured to determine one or more safety operations in response to the maintenance operations to be performed. The central control unit will then select and dispatch a safety UV 24C to perform the safety operation. The safety command provided to the safety UV 24C from the central control unit 40 can include a location near the pieces of equipment 20 requiring maintenance and instructions regarding the type and duration of safety operation to be performed.

Figure 3:
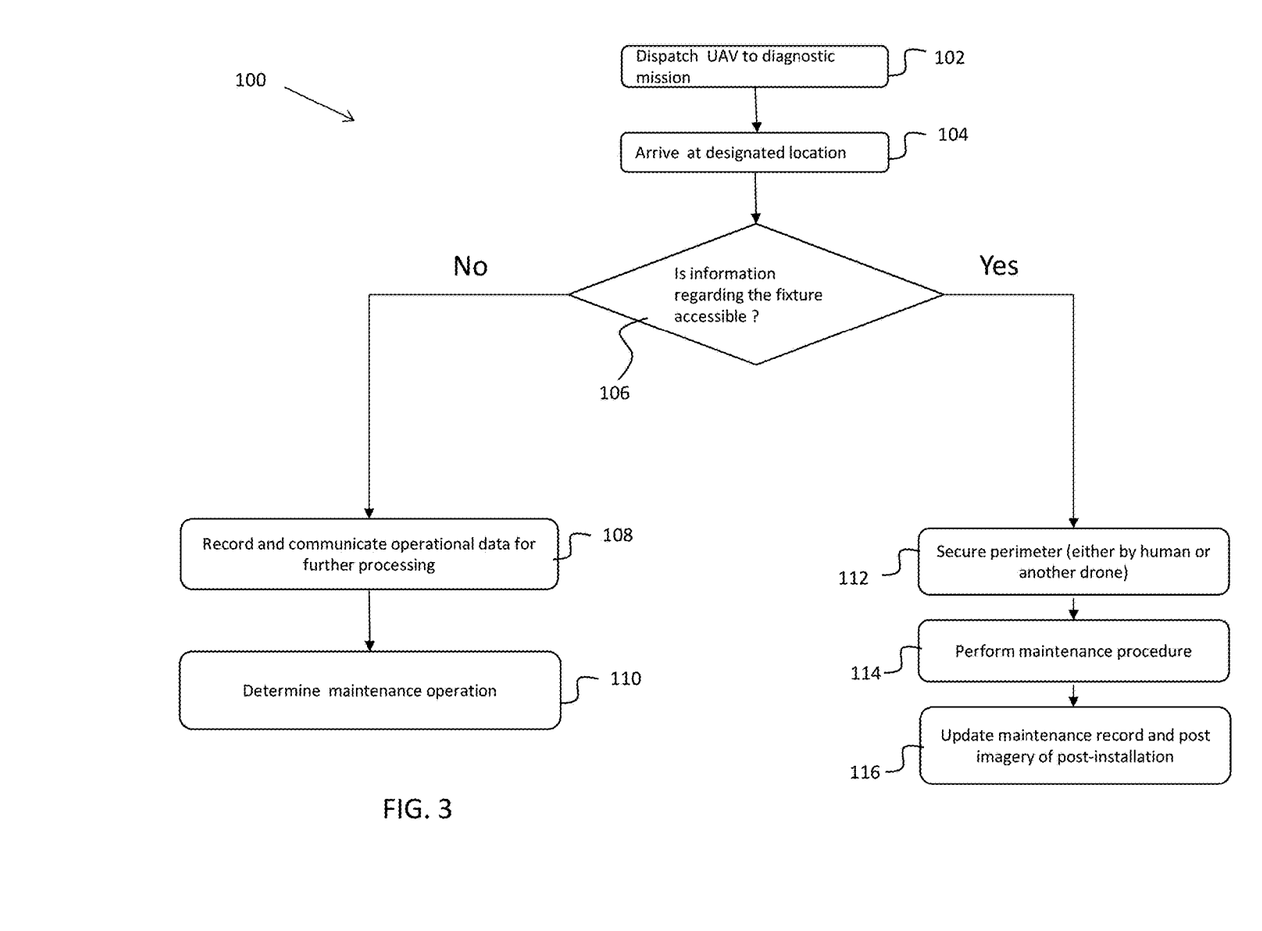
FIG. 3 depicts a flow diagram of a process for performing one or more maintenance operations according to one or more embodiments of the present invention.

With reference now to FIG. 3, a flow chart illustrating a method 100 of operating the system 22 is shown. In block 102, in response to a signal from central control unit 40, a diagnostic UV 24A is dispatched to evaluate the functionality of a piece of equipment 20 arranged at a known location within the predetermined area. As previously described, the signal to dispatch a diagnostic UV 24A can be generated based on a schedule or in response to a maintenance request input by a person. In another embodiment, the equipment 20 of the system 22 can include sensors 48 (shown in FIG. 1) or another device capable of communicating with the central control unit 40 to indicate a change in operation, thereby prompting a diagnostic evaluation.

After the diagnostic UV 24A arrives at the piece of equipment 20, as shown in block 104, a determination can be made in block 106 whether baseline or pre-existing information related to the fixture or piece of equipment 20 is stored in the memory 42 and is accessible by the central control unit 40. If the system 22 does not have any pre-existing data related to the fixture or equipment 20, the UV 24A senses one or more parameters of the fixture 20 and communicates the sensed information to the central control unit 40, as shown in block 108. In embodiments where the equipment 20 is a light fixture, the UV 24A can be configured to take an image of the fixture, which is then processed by the central control unit 40. In other embodiments, the identification and processing of the sensed information can be performed locally at the UV 24A, such as via the local control unit 46.

In block 110, the central control unit 40 determines a corresponding maintenance operation and identifies one or more parameters associated with such procedure. Examples of such parameters include, but are not limited to, the replacement part(s) needed to perform the maintenance, how to disable power to the equipment, which tool attachment 32 to use and what forces and moments can be applied, and how to operate the tool attachment 32. For example, if the central control unit 40 determines that a light bulb of the light fixture 20 needs replacing, the central control unit 40 will identify a maintenance UV 24B having a tool attachment 32 suitable for use with the type of light bulbs required by the fixture 20. The central control unit 40 will provide instructions to the selected maintenance UV 24B indicating the position of the fixture 20 and the maintenance operation required, specifically which light bulb needs to be replaced.

In the event that pre-existing information is accessible by the system 22, the central control unit 40 generates and implements a safety operation associated with the required maintenance operation, as shown in block 112. The safety operation can include blocking off access to an area surrounding the equipment 20 or providing a warning to indicate to users that a maintenance operation is being performed. The safety operation can be implemented by a person, a safety UV 24C, or a combination thereof. In all cases, a coordinated execution between all UVs 24 is maintained, to ensure that each maintenance step performed by maintenance UV 24B occurs after the safety measures were put in place by safety UV 24C. In block 114, a required maintenance operation identified by the central control unit 40 or the local control unit 44 is performed by maintenance UV 24B. Performance of the maintenance operation can include repairing or replacing parts as necessary and disposing of damaged parts. After the maintenance operation is complete, in block 116, a maintenance record associated with the maintenance operation and the piece of equipment 20 is updated. In one or more embodiments, such updating can include storing data, such as images associated with the fixture 20 before and after completion within the memory 42.

The system 22 illustrated and described herein reduces the hazards associated with typical maintenance operations by using unmanned aerial vehicles to perform those maintenance operations. Further, the process for maintenance operations can be streamlined by eliminating the need to interrupt the power supplied to the equipment or fixture during such operations.

The central control unit 40 further implements a learning algorithm (also known as cognitive computing), where overtime maintenance schedules, inspection intervals and repair procedure are updated based on real data collected for the equipment 20. For example, if a specific failure in equipment(s) 20 is detected above some threshold, the frequency of preventive maintenance for that equipment can be increased, and the maintenance procedure can be updated from "inspect" to "replace" the part which shows the common failure. Similarly, if a part is rarely shown to fail, the testing procedure can be updated to skip testing of that part in some routines inspections. The learning algorithm can also be predictive. For example, a maintenance schedule can be adapted to circumvent failures that are correlated to the ambient temperature in response to changes in the ambient environment, such as temperature or humidity. In other words the same learning algorithm can adapt and preform differently over time in two different regions.

Figure 4:
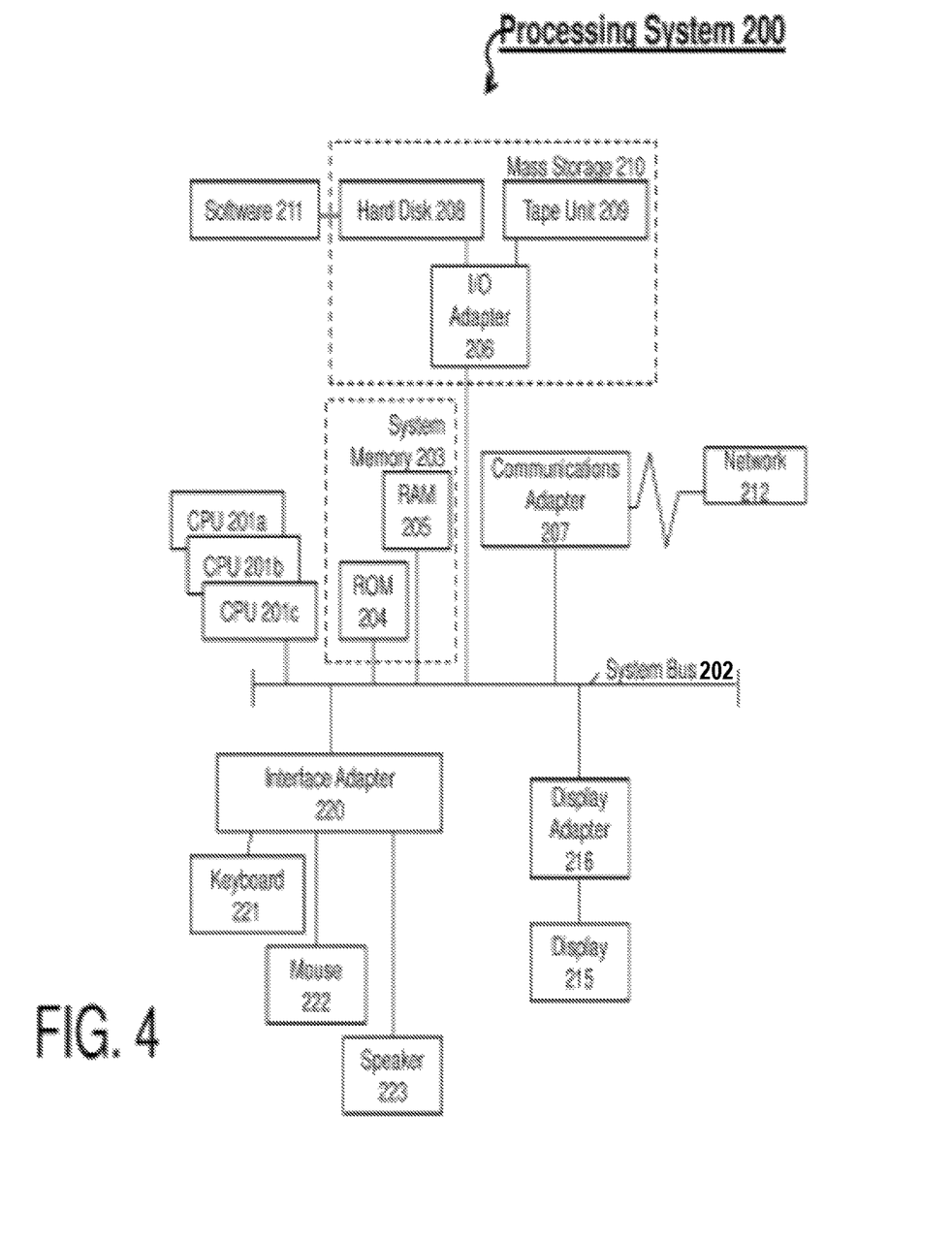
FIG. 4 depicts a computer processing system configured to implement one or more aspects of the present invention.

Referring now to FIG. 4, there is shown an example of a processing system 200 for implementing aspects of the invention described herein. The processing system 200 includes one or more central processing units (CPU(s)) 201a, 201b, 201c, etc. (collectively or generically referred to as processor(s) 201). The processors 201, also referred to as processing circuits, are coupled via a system bus 202 to system memory 203 and various other components. The system memory 203 can include a read only memory (ROM) 204 and a random access memory (RAM) 205. The ROM 204 is coupled to system bus 202 and can include a basic input/output system (BIOS), which controls certain basic functions of the processing system 200. The RAM is read-write memory coupled to the system bus 202 for use by the processors 201.

FIG. 4 further depicts an input/output (I/O) adapter 206 and a communications adapter 207 coupled to the system bus 202. The I/O adapter 206 can be a small computer system interface (SCSI) adapter that communicates with a hard disk 208 and/or tape unit (tape storage drive) 209 or any other similar component. The I/O adapter 206, the hard disk 208, and the tape unit 209 are collectively referred to herein as a mass storage 210. Software 211 for execution on the processing system 200 can be stored in the mass storage 210. The mass storage 210 is an example of a tangible storage medium readable by the processors 201, where the software 211 is stored as instructions for execution by the processors 201 to perform a method. A communications adapter 207 interconnects the system bus 202 with a network 212, which can be an outside network, enabling the processing system 200 to communicate with other such systems. A display (e.g., screen, a display monitor) 215 is connected to the system bus 202 by a display adapter 216, which can include a graphics controller to improve the performance of graphics intensive applications and a video controller. In some embodiments of the invention, the adapters 206, 207, and 216 can be connected to one or more I/O buses that are connected to the system bus 202 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 202 via an interface adapter 220 and the display adapter 216. A keyboard 221, a mouse 222, and a speaker 223 can be interconnected to the system bus 202 via the interface adapter 220, which can include, for example, a Super I/O chip integrating multiple device adapters into a single integrated circuit.

Thus, as configured in FIG. 4, the processing system 200 includes processing capability in the form of the processors 201, and, storage capability including the system memory 203 and the mass storage 210, input means such as the keyboard 221 and the mouse 222, and output capability including the speaker 223 and the display 215. In some embodiments of the invention, a portion of the system memory 203 and the mass storage 210 collectively store an operating system, such as the z/OS or AIX operating system from IBM Corporation, to coordinate the functions of the various components shown in FIG. 4. For embodiments of the invention that implement a learning algorithm, machine learning hardware (e.g., an artificial neural network) can be used.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of performing an automated maintenance operation on a piece of equipment, the method comprising:
   determining, using a processor system, a diagnostic status of the piece of equipment using a first unmanned vehicle;
   determining, using the processor system, a maintenance condition of the piece of equipment and identifying a maintenance operation and a safety operation to be performed based at least in part on the diagnostic status of the piece of equipment;
   dispatching, using the processor system, a second unmanned vehicle to perform the maintenance operation; and
   dispatching a third unmanned vehicle to hold a net underneath the piece of equipment prior to performance of the maintenance operation by the second unmanned vehicle.

2. The computer-implemented method of claim 1, wherein identifying the maintenance operation to be performed includes at least one of identifying a tool attachment and identifying a replacement part associated with the maintenance operation.

3. The computer-implemented method of claim 2, wherein dispatching the second unmanned vehicle further comprises selecting the second unmanned vehicle from a plurality of unmanned vehicles based on the maintenance operation identified, the selected unmanned vehicle including at least one of the tool attachment and replacement part associated with the maintenance operation.

4. The computer-implemented method of claim 1, wherein the safety operation includes providing at least one of an audio and a visual indicator to persons within a predetermined distance from the piece of equipment.

5. The computer-implemented method of claim 4, wherein the safety operation includes erecting safety equipment within a predetermined distance of a location of the piece of equipment.

6. The computer-implemented method of claim 1, wherein determining the diagnostic status of the piece of equipment occurs as the first unmanned vehicle moves along an inspection path.

7. The computer-implemented method of claim 1, wherein determining the diagnostic status of the piece of equipment occurs on a predetermined schedule.

8. The computer-implemented method of claim 1 further comprising processing data related to the diagnostic status of the piece of equipment using a local control unit of the first unmanned vehicle.

9. The computer-implemented method of claim 1, further comprising communicating data related to the diagnostic status of the piece of equipment from the first unmanned vehicle to a central control unit to identify the maintenance operation and the safety operation to be performed.

* * * * *